US010780782B2

(12) United States Patent
Ueta

(10) Patent No.: US 10,780,782 B2
(45) Date of Patent: Sep. 22, 2020

(54) VEHICLE INFORMATION DISPLAY SYSTEM

(71) Applicant: Yazaki Corporation, Tokyo (JP)

(72) Inventor: Keisuke Ueta, Susono (JP)

(73) Assignee: YAZAKI CORPORATION, Minato-ku, Tokyo (JP)

(*) Notice: Subject to any disclaimer, the term of this patent is extended or adjusted under 35 U.S.C. 154(b) by 43 days.

(21) Appl. No.: 16/393,036

(22) Filed: Apr. 24, 2019

(65) Prior Publication Data
US 2019/0329653 A1 Oct. 31, 2019

(30) Foreign Application Priority Data

Apr. 27, 2018 (JP) .................................. 2018-086551

(51) Int. Cl.
B60K 35/00 (2006.01)
H02J 50/10 (2016.01)
H02M 7/219 (2006.01)

(52) U.S. Cl.
CPC .............. B60K 35/00 (2013.01); H02J 50/10 (2016.02); H02M 7/219 (2013.01); B60K 2370/152 (2019.05); B60K 2370/168 (2019.05); B60K 2370/178 (2019.05); B60K 2370/47 (2019.05)

(58) Field of Classification Search
CPC ................ B60K 35/00; B60K 2370/47; B60K 2370/152; B60K 2370/168; B60K 2370/178; H02J 50/10; H02M 7/219
See application file for complete search history.

(56) References Cited

U.S. PATENT DOCUMENTS

2017/0191856 A1 7/2017 Baiz et al.

FOREIGN PATENT DOCUMENTS

| JP | 2002-067735 A | 3/2002 |
| JP | 2014-234009 A | 12/2014 |

Primary Examiner — Robert L Deberadinis
(74) Attorney, Agent, or Firm — Sughrue Mion, PLLC

(57) ABSTRACT

A vehicle information display system includes: a master-side instrument including a first power transmission coil, a first signal transmission coil, and a first case; and a meter instrument including a display unit, a second power transmission coil, a second signal transmission coil, and a second case. The master-side instrument and the meter instrument have a positional relation such that in a state in which a fitting recessed part of the first case and the second case are fitted to each other, the first power transmission coil is opposed to the second power transmission coil, and the first signal transmission coil is opposed to the second signal transmission coil.

2 Claims, 6 Drawing Sheets

VEHICLE INFORMATION DISPLAY SYSTEM

CROSS-REFERENCE TO RELATED APPLICATION(S)

The present application claims priority to and incorporates by reference the entire contents of Japanese Patent Application No. 2018-086551 filed in Japan on Apr. 27, 2018.

BACKGROUND OF THE INVENTION

1. Field of the Invention

The present invention relates to a vehicle information display system.

2. Description of the Related Art

As a vehicle information display system in the related art to be applied to a vehicle, for example, Japanese Patent Application Laid-open No. 2002-067735 discloses a display system for a vehicle that performs status display indicating various statuses of a vehicle and warning display indicating a warning status generated in the vehicle. The display system for a vehicle is constituted of a status display unit that performs status display and a warning display unit that performs warning display that are housed in individual housings to be separated from each other.

The display system for a vehicle disclosed in Japanese Patent Application Laid-open No. 2002-067735 described above is, for example, desired to be configured so that a portion that displays vehicle information is easily modified in accordance with preference, needs, and the like of a user following diversification of use modes of a vehicle.

SUMMARY OF THE INVENTION

The present invention is made in view of such a situation, and provides a vehicle information display system in which a portion that displays vehicle information can be easily replaced.

In order to achieve the above mentioned object, a vehicle information display system according to one aspect of the present invention includes a master-side instrument serving as a power supply source and including a first power transmission coil capable of transmitting electric power in a non-contact manner, a first signal transmission coil capable of transmitting a signal in a non-contact manner, and a first case in which the first power transmission coil and the first signal transmission coil are disposed and a fitting recessed part is formed; and a meter instrument serving as a supply destination of electric power from the master-side instrument and including a display unit capable of displaying vehicle information, a second power transmission coil capable of transmitting electric power in a non-contact manner with the first power transmission coil, a second signal transmission coil capable of transmitting a signal in a non-contact manner with the first signal transmission coil, and a second case in which the display unit, the second power transmission coil, and the second signal transmission coil are disposed, the second case being capable of fitting into the fitting recessed part, wherein the master-side instrument and the meter instrument have a positional relation such that in a state in which the fitting recessed part of the first case and the second case are fitted to each other, the first power transmission coil is opposed to the second power transmission coil, and the first signal transmission coil is opposed to the second signal transmission coil.

According to another aspect of the present invention, in the vehicle information display system, it is possible to configure that the master-side instrument includes a master-side controller that periodically transmits electric power to the meter instrument side via the first power transmission coil, and transmits a connection request to the meter instrument side via the first signal transmission coil, the meter instrument includes a meter-side controller that is operated in response to electric power received from the master-side instrument via the second power transmission coil, and responds to the connection request received from the master-side instrument via the second signal transmission coil, and the master-side controller and the meter-side controller transmit and receive data required for display on the display unit after a response of the meter-side controller.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 2:
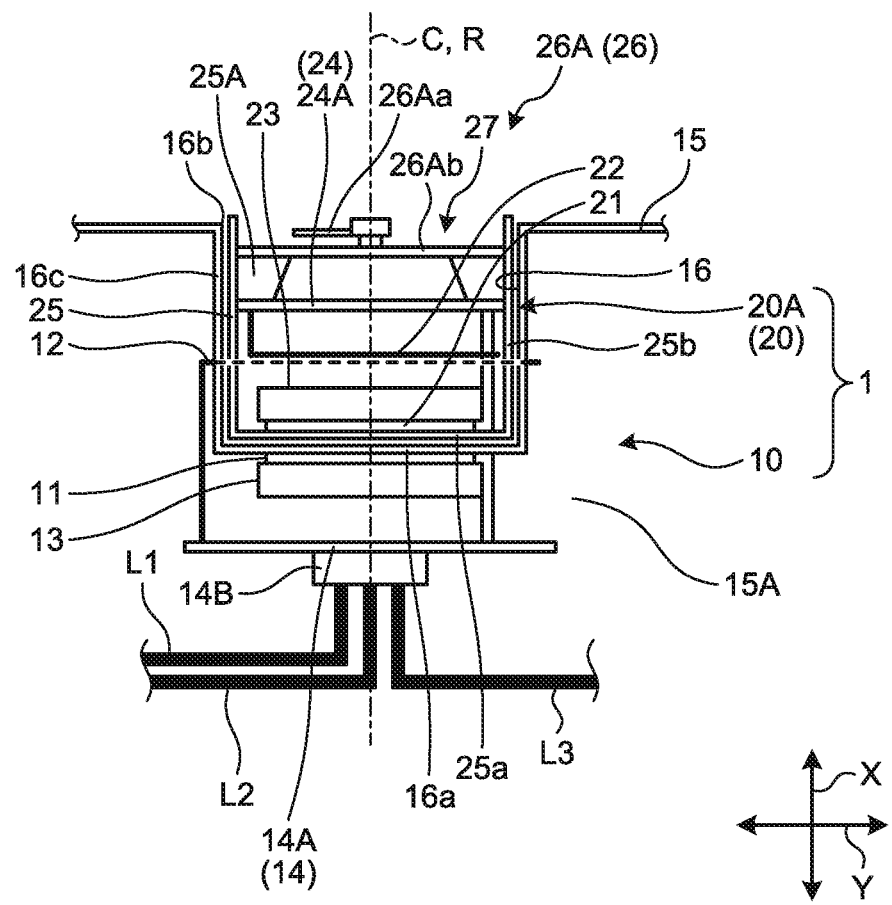
FIG. 2 is a schematic cross-sectional view illustrating a schematic configuration of the vehicle information display system according to the embodiment.
Figure 3:
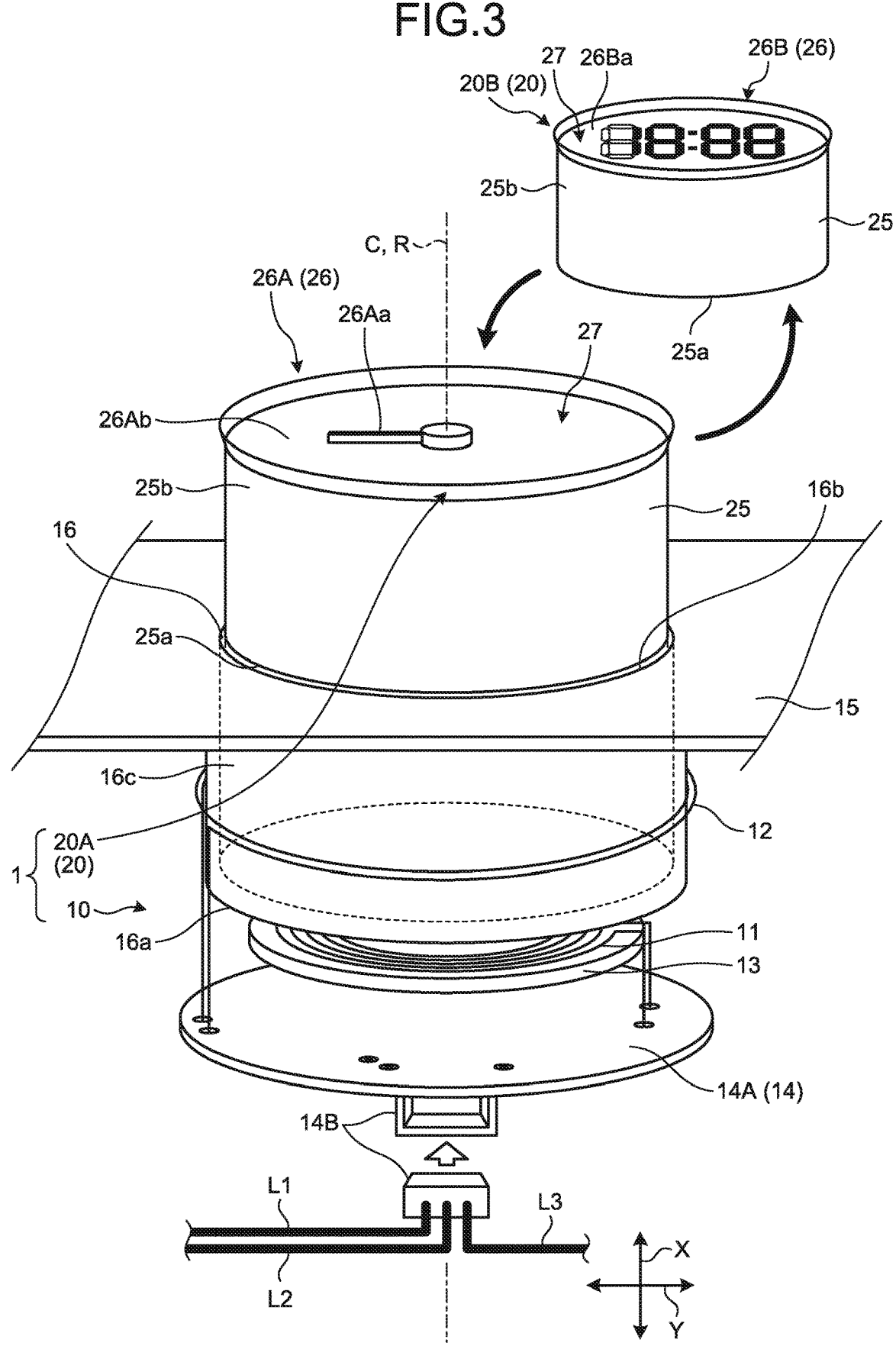
FIG. 3 is a schematic exploded perspective view illustrating a schematic configuration of the vehicle information display system according to the embodiment.
Figure 4:
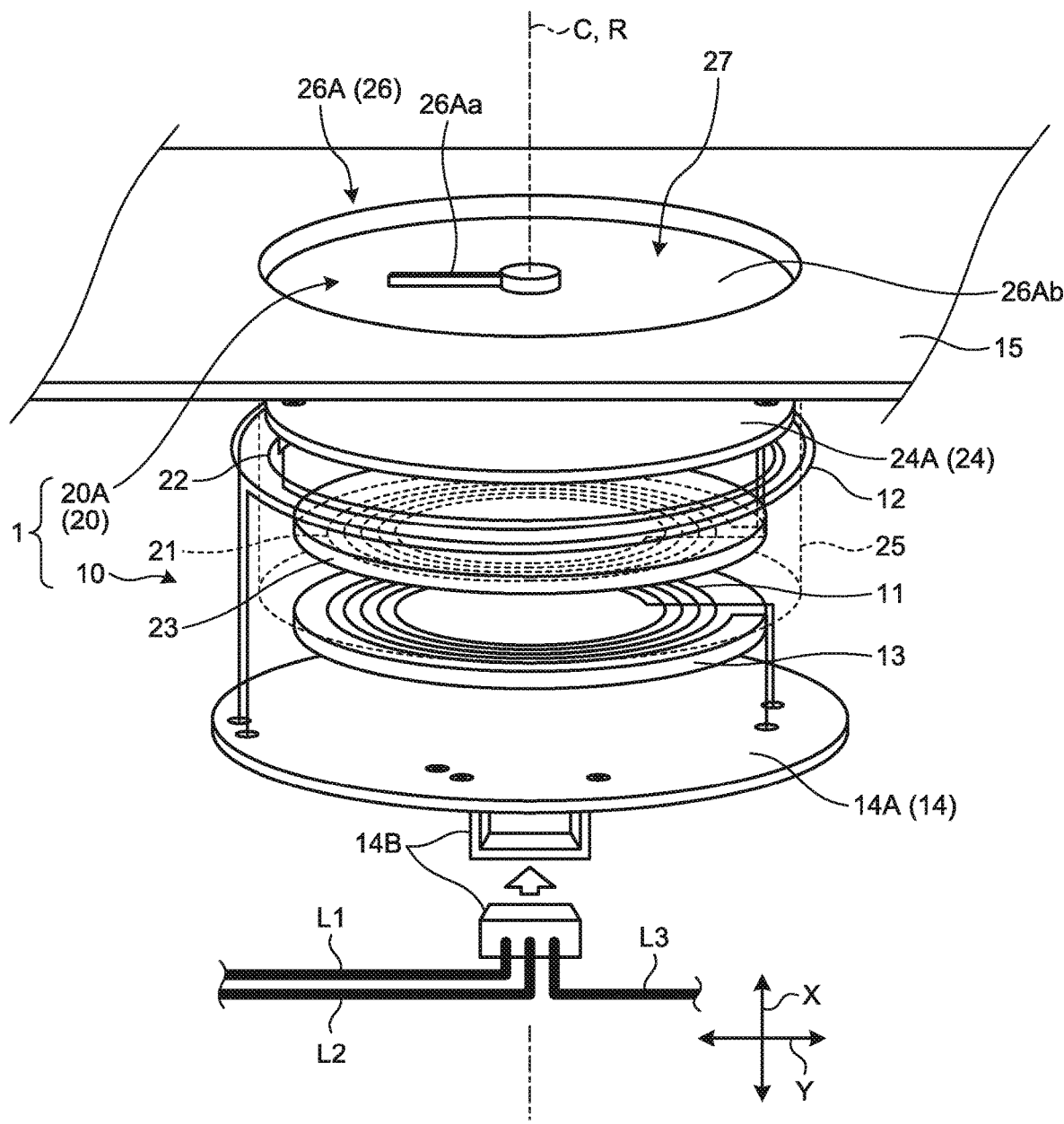
FIG. 4 is a schematic perspective view illustrating a schematic configuration of the vehicle display system according to the embodiment.

The following describes an embodiment of the present invention in detail based on the drawings. The present invention is not limited to the embodiment. Components described in the following embodiment include a component that can be easily replaced by those skilled in the art, or a component that is substantially the same. FIGS. 2, 3, and 4 illustrate a first case some parts of which are omitted.

Embodiment

Figure 1:
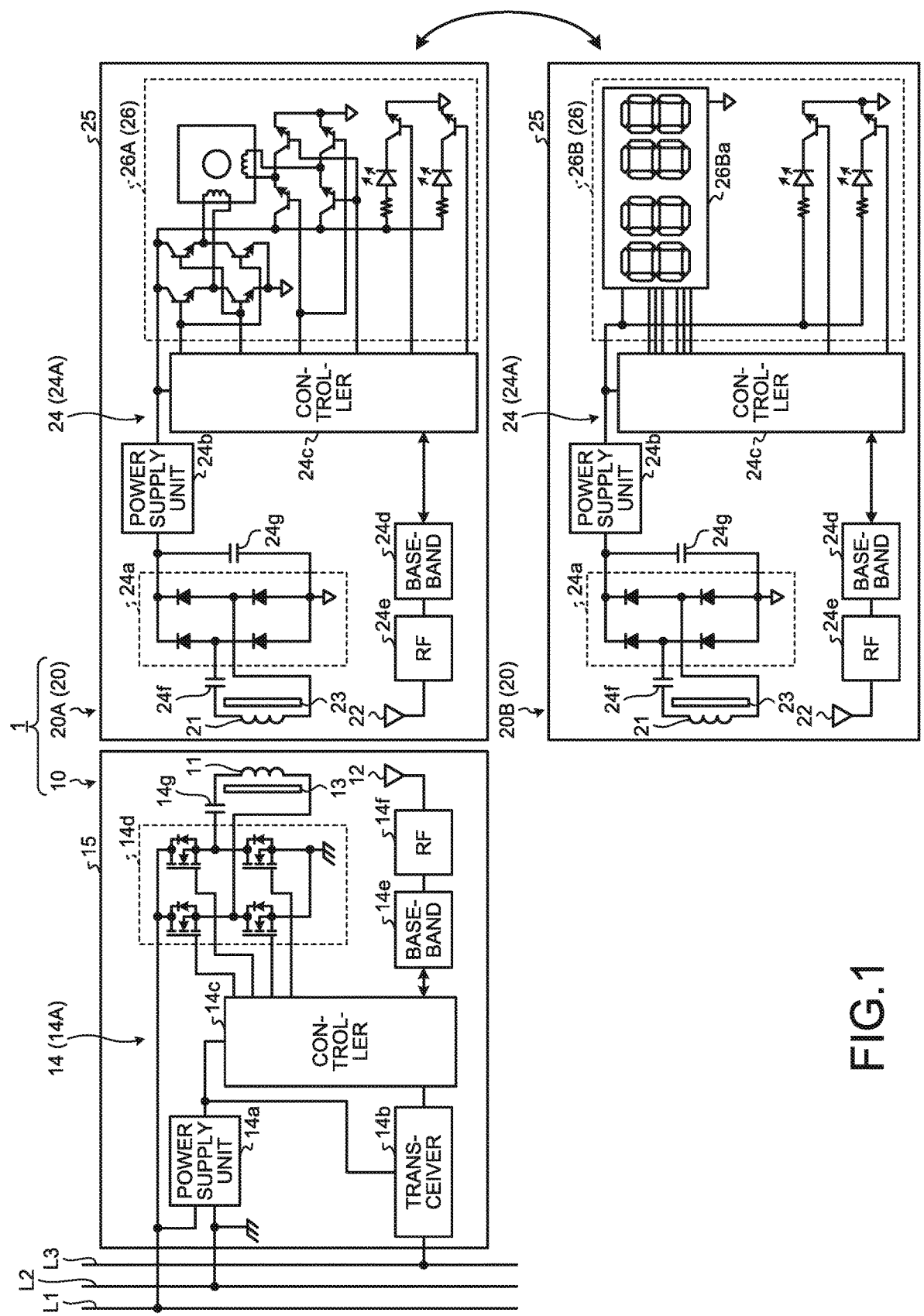
FIG. 1 is a schematic block diagram illustrating a schematic configuration of a vehicle information display system according to an embodiment.

A vehicle information display system 1 illustrated in FIG. 1 is a system that is applied to a vehicle for displaying various pieces of vehicle information. The vehicle information display system 1 is a wireless power feeding system that transmits electric power from a power supply to an instrument for displaying vehicle information in an at least partially wireless manner to achieve non-contact power transmission. The vehicle information display system 1 according to the present embodiment has a configuration in which both of electric power and a signal are transmitted in a non-contact manner between an instrument on the power supply side and the display instrument to easily customize, that is, to replace or modify a portion that displays the vehicle information in accordance with preference, needs, and the like of a user. The vehicle information display system 1 is implemented by mounting components illustrated in FIG. 1 on a vehicle. The following describes configurations of the vehicle information display system 1 in detail with reference to the drawings.

Specifically, as illustrated in FIG. 1, the vehicle information display system 1 includes a master-side instrument 10 and a meter instrument 20. As described above, the master-side instrument 10 and the meter instrument 20 are connected to each other to be able to transmit electric power and a signal in a non-contact manner. For example, the vehicle information display system 1 according to the present embodiment is configured such that any of a plurality of meter instruments 20A and 20B can be appropriately selected to be used as the meter instrument 20. The meter instrument 20 used for the vehicle information display system 1 can be appropriately selected from the meter instruments 20A and 20B, and can be replaced or modified. In the following description, the meter instrument 20A and the meter instrument 20B may be simply referred to as "meter instruments 20" in a case in which there is no need to specifically distinguish the meter instrument 20A from the meter instrument 20B.

The master-side instrument 10 is a supply source of electric power to the meter instrument 20. The master-side instrument 10 corresponds to an instrument on the power supply side, in other words, corresponds to an instrument on a power transmitting (power supplying) side. For example, the master-side instrument 10 is connected to a power supply such as a battery or a power generator, a power supply distribution functional component that distributes electric power from the power supply to respective components, a control functional component that controls power supply or signal communication, and the like via a power supply line L1, a ground (GND) line L2, a communication line L3, and the like. The power supply line L1 is a routing body for transmitting electric power to actuate each component. The ground line L2 is a routing body for achieving what is called grounding. The communication line L3 is a routing body for transmitting various communication signals.

The meter instrument 20 is a supply destination of electric power from the master-side instrument 10, and configures a slave-side instrument with respect to the master-side instrument 10. The meter instrument 20 corresponds to the display instrument described above, in other words, corresponds to a power reception-side instrument. The meter instrument 20 includes a display unit 26, and the display unit 26 is actuated by electric power from the master-side instrument 10 to display the vehicle information. The vehicle information displayed by the display unit 26 may include, for example, speed of the vehicle, an output number of revolutions of a power source for traveling, an accumulated traveling distance, a cooling water temperature, a fuel residual amount, a battery storage amount, various warning lights (a warning lamp, what is called a telltale), a shift position, a direction indicating direction, and navigation information. The meter instrument 20 may be installed in the vehicle at the time of manufacturing the vehicle, or may be a component of what is called an aftermarket part, a customized meter, and the like to be retrofitted to the vehicle after the vehicle is manufactured. By way of example herein, the meter instrument 20A is an analog meter, and includes an analog display unit 26A as the display unit 26. The display unit 26A displays, in analog form, various measured values related to the vehicle as the vehicle information using an indicator needle 26Aa (refer to FIG. 3, for example). On the other hand, a meter instrument 20B is a digital meter, and includes a digital display unit 26B as the display unit 26. The display unit 26B displays, in digital form, various measured values related to the vehicle as the vehicle information with an image on a display (LCD) 26Ba. The meter instruments 20A and 20B constitute, for example, a speedometer, a tachometer, a water-temperature gauge, an oil pressure gauge, and a boost gauge. In the following description, the display unit 26A and the display unit 26B may be simply referred to as "display units 26" in a case in which there is no need to specifically distinguish the display unit 26A from the display unit 26B.

The master-side instrument 10 includes a first power transmission coil 11, a first signal transmission coil 12, a first magnetic body 13, a first electronic circuit 14, and a first case 15. On the other hand, the meter instrument 20 includes a second power transmission coil 21, a second signal transmission coil 22, a second magnetic body 23, a second electronic circuit 24, and a second case 25. Additionally, the master-side instrument 10 and the meter instrument 20 may include a shielding member and the like made of metallic material and functioning as a noise countermeasure component by blocking electromagnetic waves (electromagnetic force) except a portion in which the first power transmission coil 11, the first signal transmission coil 12, the second power transmission coil 21, the second signal transmission coil 22, and the like are disposed.

The first power transmission coil 11 is a conductor coil that can transmit electric power in a non-contact manner with the second power transmission coil 21. The second power transmission coil 21 is a conductor coil that can transmit electric power in a non-contact manner with the first power transmission coil 11. That is, the first power transmission coil 11 and the second power transmission coil 21 can transmit electric power in a non-contact manner with each other. Each of the first power transmission coil 11 and the second power transmission coil 21 may be, for example, constituted of what is called a spiral conductor coil, or constituted of a solenoid (helical) conductor coil. The spiral conductor coil is formed by winding a conductive elemental wire around a center axis as a center in a spiral shape. On the other hand, the solenoid conductor coil is formed by winding the conductive elemental wire around the center axis as a center in a helical shape. Herein, each of the first power transmission coil 11 and the second power transmission coil 21 is, for example, constituted of a spiral conductor coil formed by being wound around a center axis C (refer to FIGS. 2, 3, and 4, for example) in a spiral shape. The first power transmission coil 11 and the second power transmission coil 21 can transmit electric power in a non-contact manner in a state of being opposed to each other using various systems such as an electromagnetic induction system and an electromagnetic field resonance system. One of the first power transmission coil 11 and the second power transmission coil 21 is a power transmission coil that transmits electric power, and the other one thereof is a power reception coil that receives electric power. Herein, regarding the first power transmission coil 11 and the second power transmission coil 21, typically, the first power transmission coil 11 as a master-side coil is the power transmission coil, and the second power transmission coil 21 as a meter-side coil is the power reception coil.

The first signal transmission coil 12 is a conductor coil that can transmit a signal in a non-contact manner with the second signal transmission coil 22. The second signal transmission coil 22 is a conductor coil that can transmit a signal in a non-contact manner with the first signal transmission coil 12. That is, the first signal transmission coil 12 and the second signal transmission coil 22 can transmit a signal in a non-contact manner with each other (wireless communication). Each of the first signal transmission coil 12 and the second signal transmission coil 22 may be, for example, constituted of what is called a spiral conductor coil, or constituted of a solenoid conductor coil. Herein, each of the first signal transmission coil 12 and the second signal transmission coil 22 is, for example, constituted of a solenoid conductor coil formed by being wound around the center axis C (refer to FIGS. 2, 3, and 4, for example) in a helical shape. The first signal transmission coil 12 and the second signal transmission coil 22 constitute a communication antenna that radiates (transmits) high-frequency energy into a space as electromagnetic waves (radio waves), or converts (receives) electromagnetic waves (radio waves) in a space into high-frequency energy. The first signal transmission coil 12 and the second signal transmission coil 22 can transmit a signal in a non-contact manner in a state of being opposed to each other using various systems. One of the first signal transmission coil 12 and the second signal transmission coil 22 is a transmission antenna that transmits a signal, and the other one thereof is a reception antenna that receives a signal.

The first magnetic body 13 and the second magnetic body 23 strengthen coupling between the first power transmission coil 11 and the second power transmission coil 21 opposite to each other by passing a magnetic flux generated by the first power transmission coil 11 and the second power transmission coil 21 therethrough. The first magnetic body 13 and the second magnetic body 23 also have a function of causing the magnetic flux from the first power transmission coil 11 and the second power transmission coil 21 to hardly reach the first signal transmission coil 12, the second signal transmission coil 22, substrates 14A and 24A (described later), and the like. For example, the first magnetic body 13 and the second magnetic body 23 are obtained by mixing iron oxide as a principal component with metallic material such as cobalt, nickel, and manganese to be sintered. The first magnetic body 13 and the second magnetic body 23 are formed in a circular shape, for example. The first magnetic body 13 is disposed to be adjacent to the first power transmission coil 11. The second magnetic body 23 is disposed to be adjacent to the second power transmission coil 21.

The first electronic circuit 14 is a circuit for implementing various functions of the master-side instrument 10. Similarly, the second electronic circuit 24 is a circuit for implementing various functions of the meter instrument 20. The first electronic circuit 14 is constituted of the substrate 14A (refer to FIGS. 2, 3, and 4, for example), and elements (electronic components) that are mounted on the substrate 14A and exhibit various functions. The first electronic circuit 14 is electrically connected to the first power transmission coil 11 and the first signal transmission coil 12. The first electronic circuit 14 is also electrically connected to the power supply line L1, the ground line L2, and the communication line L3 via a connector 14B (refer to FIGS. 2, 3, and 4, for example) and the like connected to the substrate 14A. The second electronic circuit 24 is constituted of the substrate 24A (refer to FIGS. 2 and 4, for example), and elements (electronic components) that are mounted on the substrate 24A and exhibit various functions. The second electronic circuit 24 is electrically connected to the second power transmission coil 21, the second signal transmission coil 22, and the display unit 26. Each of the substrates 14A and 24A is constituted of, for example, a printed circuit board (PCB), or a busbar plate substrate obtained by coating a busbar as a circuit body made of conductive metallic material with insulating resin material to make a substrate.

By way of example, the first electronic circuit 14 includes a power supply unit 14a, a transceiver 14b, a controller 14c as a master-side controller, an inverter 14d, a baseband unit 14e, a radio frequency (RF) circuit 14f, and the like. The power supply unit 14a is connected to the power supply line L1, the ground line L2, the controller 14c, the transceiver 14b, and the like. The power supply unit 14a receives electric power supplied from the power supply via the power supply line L1 and the like, and generates and supplies electric power to cause the transceiver 14b, the controller 14c, and the like to operate. The transceiver 14b is connected to the communication line L3, the controller 14c, and the like. The transceiver 14b is constituted of a communication circuit for transmitting and receiving an electric signal. The controller 14c is connected to the inverter 14d, the baseband unit 14e, and the like. The controller 14c controls respective components of the master-side instrument 10 including the inverter 14d, the baseband unit 14e, and the like, and is constituted of an integrated circuit mainly constituted of a microcomputer including a central operation circuit and the like. The inverter 14d is connected to the power supply line L1, the first power transmission coil 11, and the like. The inverter 14d includes a plurality of switching elements and the like. The inverter 14d converts DC power from the power supply line L1 into AC power having a predetermined frequency to be supplied to the first power transmission coil 11. The first electronic circuit 14 includes a resonance capacitor 14g that is mounted between the inverter 14d and the first power transmission coil 11 and designed in accordance with a predetermined power transmission frequency. In the first electronic circuit 14, the first power transmission coil 11 and the resonance capacitor 14g constitute an LC resonance circuit. The baseband unit 14e is connected to the controller 14c, the RF circuit 14f, and the like, and the RF circuit 14f is connected to the first signal transmission coil 12. The baseband unit 14e and the RF circuit 14f perform various pieces of processing on an electric signal for proximity wireless communication that is transmitted and received via the first signal transmission coil 12. In the master-side instrument 10, power transmission via the first power transmission coil 11 and signal transmission via the first signal transmission coil 12 are controlled by the first electronic circuit 14 configured as described above.

On the other hand, the second electronic circuit 24 includes an AC/DC circuit (rectifier circuit) 24a, a power supply unit 24b, a controller 24c as a meter-side controller, a baseband unit 24d, an RF circuit 24e, and the like. The AC/DC circuit 24a is connected to the second power transmission coil 21, the power supply unit 24b, and the like. The AC/DC circuit 24a includes a plurality of rectifier elements (diodes) and the like. The AC/DC circuit 24a converts and rectifies, to DC power, received AC power transmitted from the master-side instrument 10 side via the first power transmission coil 11, the second power transmission coil 21, and the like, and supplies the DC power to the display unit 26 via the power supply unit 24b and the like. The second electronic circuit 24 includes a resonance capacitor 24f that is mounted between the second power transmission coil 21 and the AC/DC circuit (rectifier circuit) 24a and designed in accordance with a predetermined power transmission frequency. In the second electronic circuit 24, the second power transmission coil 21 and the resonance capacitor 24f constitute an LC resonance circuit. In the second electronic circuit 24, a smoothing capacitor 24g is mounted on the power supply unit 24b side of the AC/DC circuit (rectifier circuit) 24a. The power supply unit 24b is connected to the AC/DC circuit 24a, the controller 24c, the display unit 26, and the like. The power supply unit 24b receives supplied DC power that is converted by the AC/DC circuit 24a, and generates and supplies electric power for causing the display unit 26, the controller 24c, and the like to operate. The display unit 26A of the display unit 26 includes a stepping motor that is driven by electric power from the power supply unit 24b to rotate the indicator needle 26Aa (refer to FIG. 3, for example), a motor driver circuit that controls driving of the motor, and the like. The display unit 26B of the display units 26 includes the display 26Ba that is driven by electric power from the power supply unit 24b to display an image related to the vehicle information, an LCD control circuit that controls driving of the display, and the like. The controller 24c is connected to the baseband unit 24d, the display unit 26, and the like. The controller 24c controls respective components of the meter instrument 20 including the baseband unit 24d, the display unit 26, and the like, and is constituted of an integrated circuit mainly constituted of a microcomputer including a central operation circuit and the like. The baseband unit 24d is connected to the controller 24c, the RF circuit 24e, and the like, and the RF circuit 24e is connected to the second signal transmission coil 22. The baseband unit 24d and the RF circuit 24e perform various pieces of processing on an electric signal for proximity wireless communication that is transmitted and received via the second signal transmission coil 22. In the meter instrument 20, power transmission via the second power transmission coil 21 and signal transmission via the second signal transmission coil 22 are controlled by the second electronic circuit 24 configured as described above.

The components of the master-side instrument 10 and the meter instrument 20 are assembled to the first case 15 and the second case 25, respectively. The first case 15 is a first housing in which the first power transmission coil 11, the first signal transmission coil 12, the first magnetic body 13, and the substrate 14A constituting the first electronic circuit 14 are disposed. The second case 25 is a second housing in which the second power transmission coil 21, the second signal transmission coil 22, the second magnetic body 23, the substrate 24A constituting the second electronic circuit 24, and the display unit 26 are disposed. The first case 15 and the second case 25 are made of, for example, resin material having an insulation property. Some components of the first electronic circuit 14 constituted of the substrate 14A may be disposed on the outside of the first case 15.

The first case 15 and the second case 25 according to the present embodiment are configured to be able to be fitted to each other as illustrated in FIGS. 2, 3, and 4. The first case 15 includes a fitting recessed part 16, and the second case 25 is formed to be fitted into the fitting recessed part 16. The master-side instrument 10 and the meter instrument 20 according to the present embodiment are configured to achieve a positional relation such that the first power transmission coil 11 is opposed to the second power transmission coil 21, and the first signal transmission coil 12 is opposed to the second signal transmission coil 22 in a state in which the fitting recessed part 16 of the first case 15 and the second case 25 are fitted to each other.

More specifically, the first case 15 is formed in a box shape in which a housing space part 15A is formed. The first case 15 houses the first power transmission coil 11, the first signal transmission coil 12, the first magnetic body 13, and the substrate 14A in the housing space part 15A. The first power transmission coil 11, the first signal transmission coil 12, the first magnetic body 13, and the substrate 14A are positioned in the housing space part 15A via a holding member and the like to be held. The first power transmission coil 11, the first signal transmission coil 12, the first magnetic body 13, and the substrate 14A may be fixed to each component via an adhesive agent and the like. The fitting recessed part 16 is formed in a recessed shape on an outer face of the first case 15 having a box shape. The fitting recessed part 16 is formed as a columnar space part centering on the center axis C. In other words, the fitting recessed part 16 is formed in a cylindrical recessed shape on the outer face of the first case 15 having a box shape. The fitting recessed part 16 is a space part into which the second case 25 can be fitted.

Typically, the center axis C is substantially identical to the center axis C of the first power transmission coil 11, the first signal transmission coil 12, the second power transmission coil 21, and the second signal transmission coil 22 described above. A fitting direction of the first case 15 and the second case 25 is a direction along the center axis C. In the following description, the direction along the center axis C is referred to as an "axial direction X", and a direction orthogonal to the axial direction X is referred to as a "radial direction Y" in some cases. The fitting direction described above corresponds to the axial direction X.

In the housing space part 15A, the first power transmission coil 11 is positioned to be opposed to a bottom part 16a of the fitting recessed part 16 along the axial direction X. The bottom part 16a is an end face (bottom face) at a deep part on one side in the axial direction X of the fitting recessed part 16, and is a surface opposed to, along the axial direction X, an opening 16b into which the second case 25 is inserted. In the housing space part 15A, the first signal transmission coil 12 is positioned on an outer side in the radial direction Y of a side part 16c of the fitting recessed part 16 to be wound around an outer peripheral surface of the side part 16c. The side part 16c is a surface along the axial direction X of the fitting recessed part 16, and constitutes a curved surface of a cylindrical shape. In the housing space part 15A, the first magnetic body 13 is positioned on one side of the first power transmission coil 11 with respect to the axial direction X, in this case, on the opposite side of the first signal transmission coil 12, to be adjacent to the first power transmission coil 11. In other words, in the housing space part 15A, the first magnetic body 13 is positioned on the opposite side of the first signal transmission coil 12 across the first power transmission coil 11 with respect to the axial direction X. The first magnetic body 13 is positioned so that a plate thickness direction thereof is identical to the axial direction X. In the housing space part 15A, the substrate 14A is positioned on one side of the first magnetic body 13 with respect to the axial direction X, in this case, on the opposite side of the first power transmission coil 11, with an interval from the first magnetic body 13. In other words, in the housing space part 15A, the substrate 14A is positioned on the opposite side of the first power transmission coil 11 across the first magnetic body 13 with respect to the axial direction X. That is, the first magnetic body 13 described above is positioned between the first power transmission coil 11 and the substrate 14A with respect to the axial direction X. In the master-side instrument 10, as described above, the substrate 14A, the first magnetic body 13, the first power transmission coil 11, and the first signal transmission coil 12 are arranged in this order from one side to the other side along the axial direction X in the housing space part 15A, and the respective components are coaxially positioned centered on the center axis C.

The second case 25 is formed in a tubular shape in which a housing space part 25A is formed. The second case 25 is formed in a cylindrical shape centered on the center axis C that can be fitted into the fitting recessed part 16. One end part 25a of the second case 25 in the axial direction X constitutes a blocked end face, and a side part 25b thereof along the axial direction X constitutes a curved surface of the cylindrical shape. A display surface 27 of the display unit 26 is exposed at the other side of the second case 25 in the axial direction X. The second case 25 houses the second power transmission coil 21, the second signal transmission coil 22, the second magnetic body 23, the substrate 24A, and the display unit 26 in the housing space part 25A. The second power transmission coil 21, the second signal transmission coil 22, the second magnetic body 23, the substrate 24A, and the display unit 26 are positioned and held in the housing space part 25A via a holding member and the like. The second power transmission coil 21, the second signal transmission coil 22, the second magnetic body 23, the substrate 24A, and the display unit 26 may be fixed to each component via an adhesive agent and the like. The second power transmission coil 21 is positioned to be opposed to the end part 25a of the second case 25 along the axial direction X in the housing space part 25A. The end part 25a is an end part on one side in the axial direction X of the second case 25, and is a surface opposed to the display surface 27 of the display unit 26 along the axial direction X. In the housing space part 25A, the second signal transmission coil 22 is positioned on an inner side in the radial direction Y of the side part 25b of the second case 25 to be wound around an inner peripheral surface of the side part 25b. In the housing space part 25A, the second magnetic body 23 is positioned on one side of the second power transmission coil 21 with respect to the axial direction X, in this case, on the second signal transmission coil 22 side, to be adjacent to the first power transmission coil 11. In other words, in the housing space part 15A, the second magnetic body 23 is positioned between the second power transmission coil 21 and the second signal transmission coil 22 with respect to the axial direction X. The second magnetic body 23 is positioned so that a plate thickness direction thereof is identical to the axial direction X. In the housing space part 25A, the substrate 24A is positioned on one side of the second magnetic body 23 with respect to the axial direction X, in this case, on the opposite side of the second power transmission coil 21 with an interval from the second magnetic body 23. That is, the second magnetic body 23 described above is positioned between the second power transmission coil 21 and the substrate 24A with respect to the axial direction X. In other words, in the housing space part 25A, the substrate 24A is positioned on the opposite side of the second magnetic body 23 side of the second signal transmission coil 22 with respect to the axial direction X with an interval from the second signal transmission coil 22. In the housing space part 25A, the display unit 26 is positioned on the opposite side of the second signal transmission coil 22 side of the substrate 24A with respect to the axial direction X to be mounted on the substrate 24A. As described above, in the meter instrument 20, the display unit 26, substrate 24A, the second signal transmission coil 22, the second magnetic body 23, and the second power transmission coil 21 are arranged in this order from one side to the other side along the axial direction X in the housing space part 25A, and the respective components are coaxially positioned centered on the center axis C. In the meter instrument 20, as described above, the display surface 27 of the display unit 26 is exposed on the opposite side of the end part 25a side in the axial direction X of the second case 25. The display surface 27 is a surface of the display unit 26 for displaying the vehicle information. For example, in the display unit 26A, the display surface 27 is constituted of the indicator needle 26Aa, and a dial plate 26Ab in which divisions and the like indicated by the indicator needle 26Aa are disposed. For example, in the display unit 26B, the display surface 27 is constituted of the display 26Ba that displays an image.

Regarding the master-side instrument 10 and the meter instrument 20 configured as described above, in a state in which the fitting recessed part 16 of the first case 15 and the second case 25 are fitted to each other (hereinafter, simply referred to as a "fitting state" in some cases), substantially the entire second case 25 is positioned within the fitting recessed part 16. In the master-side instrument 10 and the meter instrument 20, the first case 15 and the second case 25 are held in a fitting state. In the first case 15 and the second case 25 in the fitting state, the bottom part 16a is opposed to the end part 25a along the axial direction X, and the opposed bottom part 16a and end part 25a both extend along the radial direction Y. In the first case 15 and the second case 25 in the fitting state, the side part 16c is positioned on the outer side and the side part 25b is positioned on the inner side, the side part 16c is opposed to the side part 25b along the radial direction Y, and the opposed side part 16c and side part 25b both extend along the axial direction X.

In the master-side instrument 10 and the meter instrument 20 in the fitting state, the positions of the first power transmission coil 11 and the second power transmission coil 21 are set to achieve a positional relation such that the first power transmission coil 11 is opposed to the second power transmission coil 21 along the axial direction X. In the fitting state, the first power transmission coil 11 and the second power transmission coil 21 are positioned to be opposed to each other across the bottom part 16a of the fitting recessed part 16 and the end part 25a of the second case 25 along the axial direction X. With this configuration, in the master-side instrument 10 and the meter instrument 20, a coupling axis direction (hereinafter, referred to as a "coupling axis direction at the time of transmitting electric power" in some cases) is a direction along the axial direction X, the coupling axis direction in which an electromagnetic field of the first power transmission coil 11 is coupled with an electromagnetic field of the second power transmission coil 21 in transmitting electric power.

In the master-side instrument 10 and the meter instrument 20 in the fitting state, the positions of the first signal transmission coil 12 and the second signal transmission coil 22 are set to achieve a positional relation such that the first signal transmission coil 12 is opposed to the second signal transmission coil 22 along the radial direction Y. In the fitting state, the first signal transmission coil 12 and the second signal transmission coil 22 are opposed to each other across the side part 16c of the fitting recessed part 16 and the side part 25b of the second case 25 along the radial direction Y, and the second signal transmission coil 22 is positioned on the inner side of the first signal transmission coil 12. With this configuration, in the master-side instrument 10 and the meter instrument 20, a coupling axis direction (hereinafter, referred to as a "coupling axis direction at the time of transmitting a signal" in some cases) is a direction along the radial direction Y, the coupling axis direction in which an electromagnetic field of the first signal transmission coil 12 is coupled with an electromagnetic field of the second signal transmission coil 22 in transmitting a signal.

The master-side instrument 10 and the meter instrument 20 are configured as described above, so that the coupling axis direction at the time of transmitting electric power and the coupling axis direction at the time of transmitting a signal are different from each other, that is, orthogonal to each other herein. In other words, in the master-side instrument 10 and the meter instrument 20, the first power transmission coil 11, the first signal transmission coil 12, the second power transmission coil 21, and the second signal transmission coil 22 are arranged to achieve a positional relation such that the coupling axis direction at the time of transmitting electric power and the coupling axis direction at the time of transmitting a signal are orthogonal to each other. With this configuration, the master-side instrument 10 and the meter instrument 20 can relatively strengthen coupling between the first power transmission coil 11 and the second power transmission coil 21 at the time of transmitting electric power, and coupling between the first signal transmission coil 12 and the second signal transmission coil 22 at the time of transmitting a signal. Additionally, with this configuration, the master-side instrument 10 and the meter instrument 20 can relatively weaken the coupling between the first power transmission coil 11 and the second power transmission coil 21, and the first signal transmission coil 12 and the second signal transmission coil 22. As a result, the master-side instrument 10 and the meter instrument 20 can achieve efficient power transmission and high-quality signal transmission.

The master-side instrument 10 and the meter instrument 20 are configured as described above, so that, in the fitting state, the first case 15 and the second case 25 can relatively rotate about the center axis C constituting a rotation axis R while keeping the fitting state. With the vehicle information display system 1 having this configuration, for example, the meter instrument 20 can be installed at an angle preferred by a user with respect to the center axis C.

The vehicle information display system 1 may include a position fixing part for fixing the meter instrument 20 to the master-side instrument 10 at a predetermined angular position around the center axis C. In this case, for example, the position fixing part may include a guide recessed part and a guide protruding part. One of the guide recessed part and the guide protruding part is disposed on the side part 16c of the fitting recessed part 16, and the other one of the guide recessed part and the guide protruding part is disposed on the side part 25b of the second case 25. For example, in a case in which the guide recessed part is disposed on the side part 25b of the second case 25, the guide recessed part is formed along the center axis C from an end on the end part 25a side of the side part 25b. In a case in which the guide protruding part is disposed on the side part 16c of the fitting recessed part 16, the guide protruding part is formed along the center axis C from an end on the bottom part 16a side of the side part 16c. When the fitting recessed part 16 of the first case 15 is fitted to the second case 25 in a positional relation such that the guide protruding part is inserted into the guide recessed part along the center axis C, the position fixing part can fix the meter instrument 20 to the master-side instrument 10 at a predetermined angular position around the center axis C with the guide protruding part and the guide recessed part. Additionally, when a plurality of guide recessed parts into which the guide protruding part can be inserted are disposed on the side part 25b, the position fixing part may be configured so that the meter instrument 20 can be fixed to the master-side instrument 10 at a plurality of desired angular positions. With such configurations, the vehicle information display system 1 can further improve usability and customizability. For example, in a case in which the guide recessed part is disposed on the side part 16c of the fitting recessed part 16, the guide recessed part is formed along the center axis C from an end on the opening 16b side of the side part 16c. In a case in which the guide protruding part is disposed on the side part 25b of the second case 25, the guide protruding part is formed along the center axis C from an end on the opposite side of the end part 25a side of the side part 25b.

Figure 5:
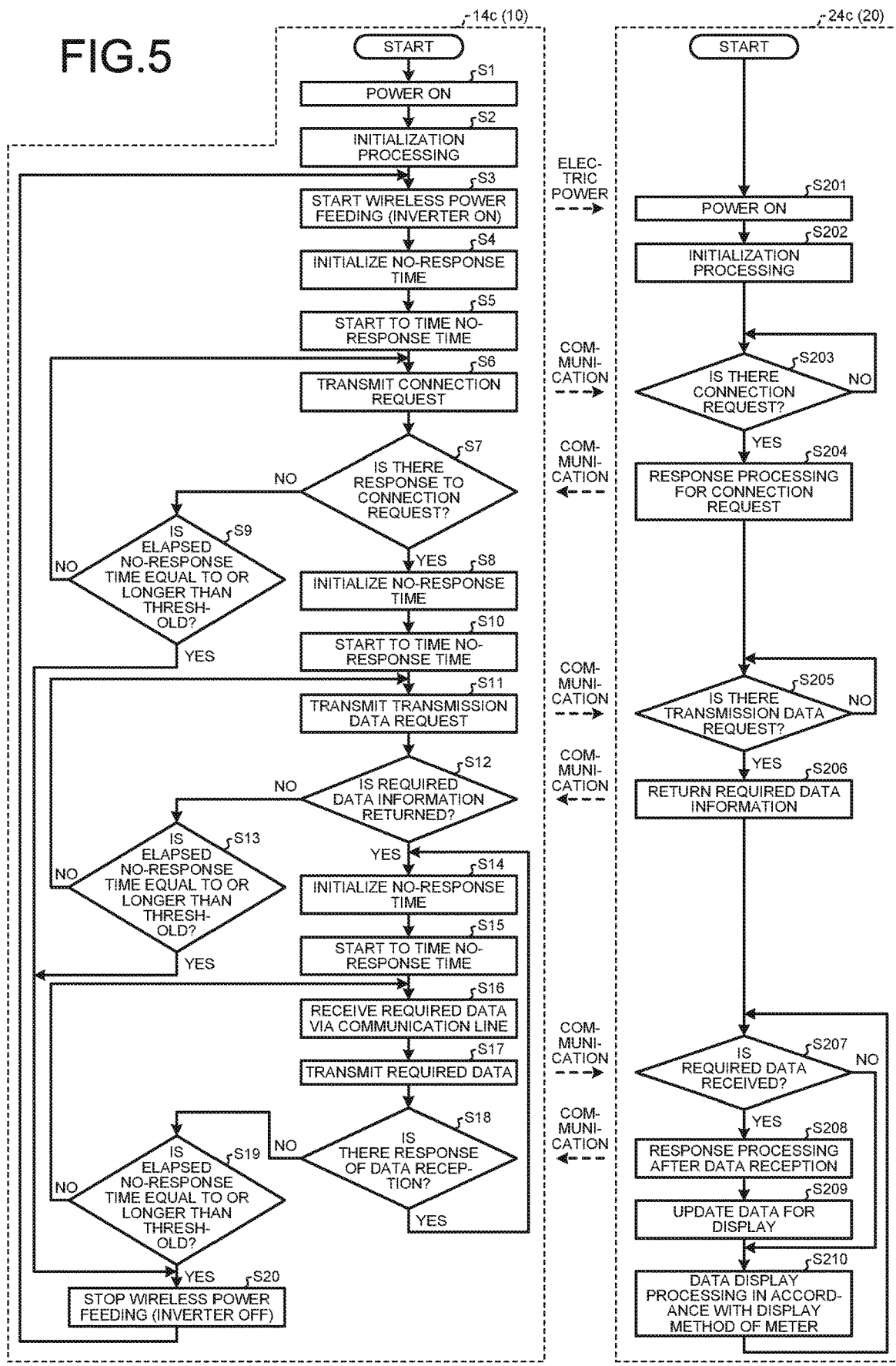
FIG. 5 is a flowchart illustrating an example of control in the vehicle information display system according to the embodiment.

Next, with reference to FIG. 5, the following describes authentication of the meter instrument 20 and required data exchange after the meter instrument 20 is disposed in the fitting recessed part 16 of the master-side instrument 10. As explanation of an outline of the authentication and the required data exchange, first, the controller 14c as the master-side controller periodically transmits electric power to the meter instrument 20 via the first power transmission coil 11, and transmits a connection request thereto via the first signal transmission coil 12. The controller 24c as the meter-side controller is operated in response to electric power received from the master-side instrument 10 via the second power transmission coil 21, and responds to the connection request received therefrom via the second signal transmission coil 22. After the response of the controller 24c, the controller 14c and the controller 24c transmit and receive data required for display on the display unit 26. The following describes an example of details about this control.

First, for example, when an ignition of the vehicle is turned ON and the master-side instrument 10 is "POWERED ON" to be activated (Step S1), the controller 14c on the master-side instrument 10 side performs initialization processing (Step S2). The controller 14c clears various timers and a temporary storage region as initialization processing, for example.

Next, the controller 14c turns ON the inverter 14d, and starts transmission of electric power via the first power transmission coil 11, that is, wireless power feeding (Step S3). The controller 14c periodically transmits electric power via the first power transmission coil 11 at predetermined cycles.

Next, the controller 14c clears a timing value (count value) of a timer for timing a no-response time, and initializes the no-response time (Step S4).

Next, the controller 14c starts to time the no-response time (Step S5).

Next, the controller 14c transmits a connection request via the first signal transmission coil 12 (Step S6), and advances the process to Step S7. The controller 14c periodically transmits the connection request via the first signal transmission coil 12 at predetermined cycles.

On the other hand, when the meter instrument 20 is disposed in the fitting recessed part 16 of the master-side instrument 10, the controller 24c on the meter instrument 20 side receives, via the second power transmission coil 21, electric power that is transmitted from the first power transmission coil 11 of the master-side instrument 10 at Step S3, and the meter instrument 20 is "POWERED ON" to be activated (Step S201).

Next, the controller 24c performs initialization processing (Step S202). For example, the controller 24c clears various timers and a temporary storage region as initialization processing.

Next, the controller 24c determines whether there is a connection request from the master-side instrument 10 (Step S203).

The controller 24c receives, via the second signal transmission coil 22, the connection request that is transmitted from the first signal transmission coil 12 of the master-side instrument 10 at Step S6. If it is determined that there is a connection request from the master-side instrument 10 (Yes at Step S203), the controller 24c performs response processing for the connection request (Step S204), and advances the process to Step S205. The controller 24c transmits a response signal via the second signal transmission coil 22 as response processing for the connection request to respond to the connection request. If it is determined that there is no connection request from the master-side instrument 10 (No at Step S203), the controller 24c repeatedly performs the processing at Step S203 until it is determined that there is a connection request.

At Step S7, the controller 14c determines whether there is a response to the connection request from the meter instrument 20 (Step S7).

The controller 14c receives, via the first signal transmission coil 12, the response signal that is transmitted from the second signal transmission coil 22 of the meter instrument 20 at Step S204. If it is determined that there is a response to the connection request from the meter instrument 20 (Yes at Step S7), the controller 14c authenticates connection of the meter instrument 20, and advances the process to Step S8. If it is determined that there is no response to the connection request from the meter instrument 20 (No at Step S7), the controller 14c determines whether an elapsed no-response time is equal to or longer than a threshold set in advance (Step S9). If it is determined that the no-response time is shorter than the threshold (No at Step S9), the controller 14c returns the process to Step S6, and repeatedly performs succeeding processing. If it is determined that the elapsed no-response time is equal to or longer than the threshold (Yes at Step S9), the controller 14c turns OFF the inverter 14d, temporarily stops transmission of electric power via the first power transmission coil 11, that is, wireless power feeding (Step S20), returns the process to Step S3, and repeatedly performs succeeding processing.

At Step S8, the controller 14c clears a timing value (count value) of the timer for timing the no-response time, and initializes the no-response time (Step S8).

Next, the controller 14c starts to time the no-response time (Step S10).

Next, the controller 14c transmits a transmission data request via the first signal transmission coil 12 (Step S11), and advances the process to Step S12. The transmission data request is a request for inquiring about required data to be used on the meter instrument 20 side.

At Step S205, the controller 24c determines whether there is a transmission data request from the master-side instrument 10 (Step S205).

The controller 24c receives, via the second signal transmission coil 22, the transmission data request that is transmitted from the first signal transmission coil 12 of the master-side instrument 10 at Step S11. If it is determined that there is a transmission data request from the master-side instrument 10 (Yes at Step S205), the controller 24c returns required data information via the second signal transmission coil 22 (Step S206), and advances the process to Step S207. The required data information is information representing required data (for example, speed of the vehicle and measured value data of an output number of revolutions of a power source for traveling) to be used for display on the display unit 26 of the meter instrument 20. If it is determined that there is no transmission data request from the master-side instrument 10 (No at Step S205), the controller 24c repeatedly performs the processing at Step S205 until it is determined that there is a transmission data request.

At Step S12, the controller 14c determines whether the required data information is returned from the meter instrument 20 (Step S12).

The controller 14c receives, via the first signal transmission coil 12, the required data information that is transmitted from the second signal transmission coil 22 of the meter instrument 20 at Step S206. If it is determined that the required data information is returned from the meter instrument 20 (Yes at Step S12), the controller 14c advances the process to Step S14. If it is determined that the required data information is not returned from the meter instrument 20 (No at Step S12), the controller 14c determines whether the elapsed no-response time is equal to or longer than the threshold set in advance (Step S13). If it is determined that the no-response time is shorter than the threshold (No at Step S13), the controller 14c returns the process to Step S11, and repeatedly performs succeeding processing. If it is determined that the elapsed no-response time is equal to or longer than the threshold (Yes at Step S13), the controller 14c advances the process to Step S20.

At Step S14, the controller 14c clears the timing value (count value) of the timer for timing the no-response time, and initializes the no-response time (Step S14).

Next, the controller 14c starts to time the no-response time (Step S15).

Next, the controller 14c receives required data corresponding to the required data information returned from the meter instrument 20 from an electronic control unit (ECU) and the like that integrally control the components of the vehicle, via the communication line L3 (Step S16).

Next, the controller 14c transmits the required data received at Step S16 to the meter instrument 20 via the first signal transmission coil 12 (Step S17), and advances the process to Step S18.

At Step S207, the controller 24c determines whether the required data is received from the master-side instrument 10 (Step S207).

The controller 24c receives, via the second signal transmission coil 22, the required data that is transmitted from the first signal transmission coil 12 of the master-side instrument 10 at Step S17. If it is determined that the required data is received from the master-side instrument 10 (Yes at Step S207), the controller 24c performs response processing after data reception (Step S208), and advances the process to Step S209. The controller 24c transmits a response signal via the second signal transmission coil 22 as the response processing after data reception to respond to reception of the required data. At Step S209, the controller 24c updates data to be displayed by the display unit 26 (Step S209). Next, the controller 24c performs data display processing in accordance with a display method of the meter, causes the display unit 26 to actually display the data (Step S210), returns the process to Step S207, and repeatedly performs succeeding processing. If it is determined that the required data is not received from the master-side instrument 10 (No at Step S207), the controller 24c skips the process at Step S208 and the process at Step S209, and advances the process to Step S210.

At Step S18, the controller 14c determines whether there is a response of data reception from the meter instrument 20 (Step S18).

The controller 14c receives, via the first signal transmission coil 12, the response signal that is transmitted from the second signal transmission coil 22 of the meter instrument 20 at Step S208. If it is determined that there is a response of data reception from the meter instrument 20 (Yes at Step S18), the controller 14c returns the process to Step S14, and repeatedly performs succeeding processing. If it is determined that there is no response of data reception from the meter instrument 20 (No at Step S18), the controller 14c determines whether the elapsed no-response time is equal to or longer than the threshold set in advance (Step S19). If it is determined that the no-response time is shorter than the threshold (No at Step S19), the controller 14c returns the process to Step S16, and repeatedly performs succeeding processing. If it is determined that the elapsed no-response time is equal to or longer than the threshold (Yes at Step S19), the controller 14c advances the process to Step S20.

For example, the controller 14c and the controller 24c repeatedly perform the processing described above until the ignition of the vehicle is turned OFF and the vehicle information display system 1 is "POWERED OFF".

The vehicle information display system 1 described above is configured such that the master-side instrument 10 as a power supply source includes the first power transmission coil 11, the first signal transmission coil 12, and the first case 15. The vehicle information display system 1 is also configured such that the meter instrument 20 as a supply destination of electric power from the master-side instrument 10 includes the display unit 26, the second power transmission coil 21, the second signal transmission coil 22, and the second case 25. In the vehicle information display system 1, the fitting recessed part 16 of the first case 15 and the second case 25 are fitted to each other, the first power transmission coil 11 is opposed to the second power transmission coil 21, and the first signal transmission coil 12 is opposed to the second signal transmission coil 22. With this configuration, in the vehicle information display system 1, the first power transmission coil 11 and the second power transmission coil 21 can transmit electric power in a non-contact manner with each other, and the first signal transmission coil 12 and the second signal transmission coil 22 can transmit a signal in a non-contact manner with each other. As a result, for example, in the vehicle information display system 1, the meter instrument 20 and the master-side instrument 10 can be connected to each other in a state of being able to easily transmit electric power and a signal therebetween by fitting the second case 25 of the meter instrument 20 into the fitting recessed part 16 of the first case 15 of the master-side instrument 10 without connection work and the like. As a result, in the vehicle information display system 1, the meter instrument 20 including the display unit 26 as a portion for displaying the vehicle information can be easily replaced. Due to this, the vehicle information display system 1 can be configured so that the portion for displaying the vehicle information can be easily modified and customized in accordance with preference, needs, and the like of a user following diversification of use modes of the vehicle.

Figure 6:
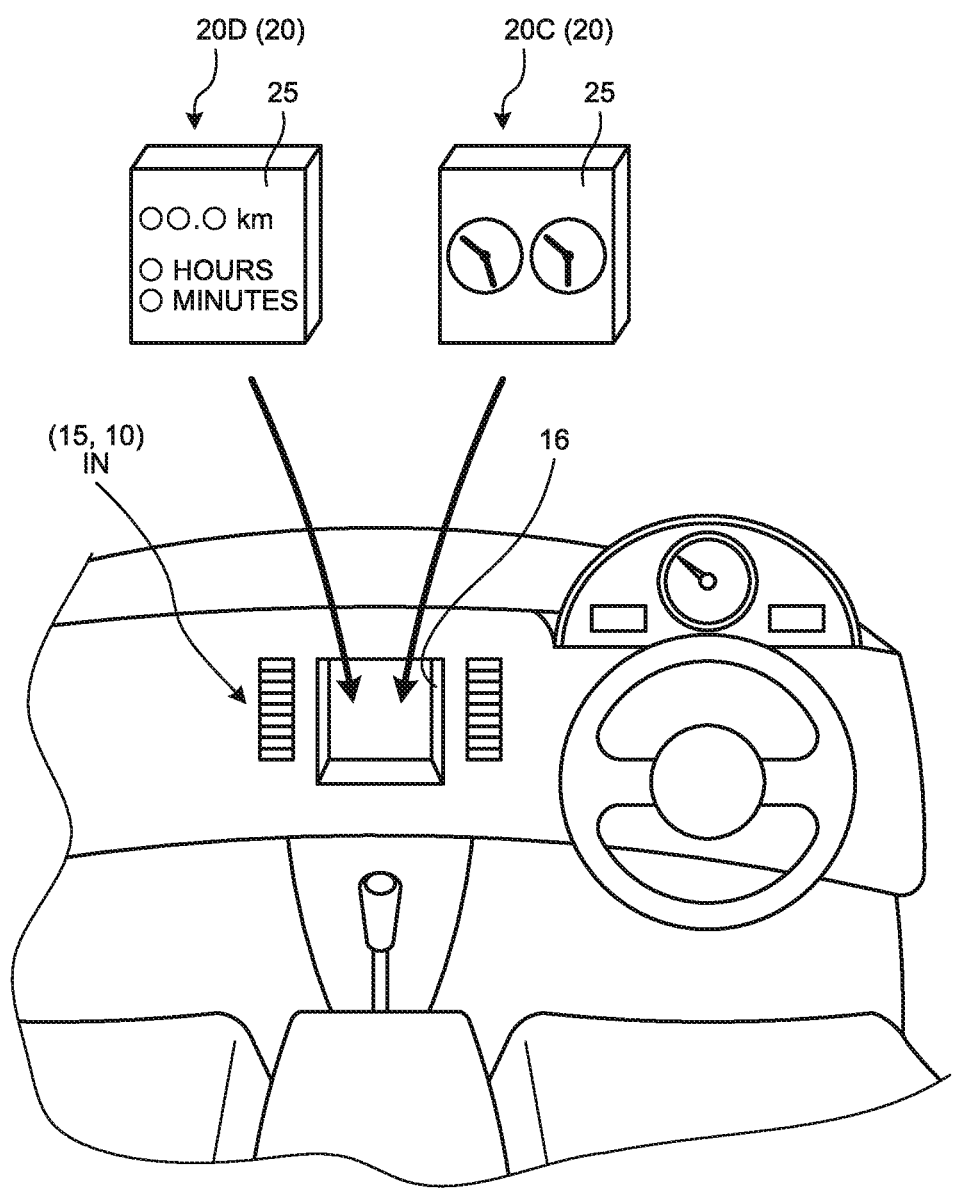
FIG. 6 is a schematic diagram illustrating an example of a use mode of the vehicle information display system according to the embodiment.

For example, as an example of diversification of use modes of the vehicle, there is a case in which one vehicle is used for an individual while providing a service of allowing other people to ride thereon for pay such as ride sharing by utilizing idle time when the vehicle is not used for an individual. In such a case, as illustrated in FIG. 6, for example, in the vehicle information display system 1, a meter instrument 20C for individual use and a meter instrument 20D used for ride sharing can be easily replaced with each other to be used as the meter instrument 20 in accordance with the use mode of the vehicle. In the example of FIG. 6, in the vehicle information display system 1, the fitting recessed part 16 having a substantially rectangular column shape is disposed on an instrument panel IN constituting part of the first case 15 of the master-side instrument 10, and second cases 25 of the meter instruments 20C and 20D that can be fitted into the fitting recessed part 16 are formed to have a substantially rectangular parallelepiped box shape. The meter instrument 20D used for ride sharing is, for example, configured to display a riding time, a riding distance, and the like of a passenger as the vehicle information unlike the meter instrument 20C.

Additionally, the vehicle information display system 1 can implement a configuration in which non-contact power feeding and wireless communication can be performed between the master-side instrument 10 and the meter instrument 20 without electrical contact between the master-side instrument 10 and the meter instrument 20 only by fitting the second case 25 into the fitting recessed part 16. As a result, the vehicle information display system 1 can suppress force required for fitting the master-side instrument 10 to the meter instrument 20 to be relatively small, so that the portion for displaying the vehicle information can be easily replaced also in this point of view. Furthermore, in the vehicle information display system 1, the master-side instrument 10 and the meter instrument 20 have a structure without electrical contact, so that durability can be improved, a relatively large number of times of replacement of the meter instrument 20 can be allowed, and frequent replacement can be allowed, for example.

With the vehicle information display system 1 described above, noise can be prevented from being released to the outside by employing proximity wireless communication such as NFC the communication distance of which is short (for example, about 10 mm or less) in signal transmission between the first signal transmission coil 12 and the second signal transmission coil 22. By utilizing this fact, for example, the vehicle information display system 1 may be configured so that communication content through signal transmission between the first signal transmission coil 12 and the second signal transmission coil 22 is hardly intercepted from the outside by securing the depth (length along the axial direction X) of the fitting recessed part 16 of the first case 15 to be sufficiently longer than the communication distance. The vehicle information display system 1 can also be configured so that the electrical contact is not exposed to the outside of the first case 15 and the second case 25, so that an appropriate waterproof property can be easily secured with a simple configuration.

Herein, in the vehicle information display system 1 described above, the controller 14c on the master-side instrument 10 periodically transmits electric power to the meter instrument 20 via the first power transmission coil 11, and transmits a connection request thereto via the first signal transmission coil 12. In the vehicle information display system 1, the controller 24c of the meter instrument 20 is operated in response to electric power received from the master-side instrument 10 via the second power transmission coil 21, and responds to the connection request received via the second signal transmission coil 22. In the vehicle information display system 1, after the response of the controller 24c, the controller 14c and the controller 24c transmit and receive data required for display on the display unit 26. Thus, in the vehicle information display system 1, required data is transmitted and received between the master-side instrument 10 and the meter instrument 20 after the meter instrument 20 responds to the master-side instrument 10, so that security can be improved.

The vehicle information display system according to the embodiment of the present invention described above is not limited to the embodiment, and can be variously modified within a scope of claims.

In the above description, the fitting recessed part 16 is formed as a columnar space part centered on the center axis C, and the second case 25 is formed to have a cylindrical shape that can be fitted into the fitting recessed part 16 and is centered on the center axis C. However, the embodiment is not limited thereto. As exemplified in FIG. 6, the fitting recessed part 16 may be formed in a substantially rectangular column shape, and the second case 25 may be formed to have a substantially rectangular parallelepiped box shape that can be fitted into the fitting recessed part 16. Additionally, the fitting recessed part 16 and the second case 25 may have another shape.

The controller 14c described above may transmit all pieces of required data estimated in advance to the meter instrument 20 without individually inquiring of the meter instrument 20 about the required data. Also in this case, the controller 14c and the controller 24c can improve security by transmitting and receiving data required for display on the display unit 26 after the response of the controller 24c.

In the above description, the center axis C of the fitting recessed part 16 and the second case 25 is assumed to be identical to the center axis C of the first power transmission coil 11, the first signal transmission coil 12, the second power transmission coil 21, and the second signal transmission coil 22. However, the embodiment is not limited thereto. The center axes C may be slightly eccentric from each other.

The vehicle information display system according to the present embodiment is configured such that a master-side instrument as a power supply source includes a first power transmission coil, a first signal transmission coil, and a first case. The vehicle information display system is also configured such that a meter instrument as a supply destination of electric power from the master-side instrument includes a display unit, a second power transmission coil, a second signal transmission coil, and a second case. In the vehicle information display system, a fitting recessed part of the first case and the second case are fitted to each other, the first power transmission coil is opposed to the second power transmission coil, and the first signal transmission coil is opposed to the second signal transmission coil. With this configuration, in the vehicle information display system, the first power transmission coil and the second power transmission coil can transmit electric power in a non-contact manner with each other, and the first signal transmission coil and the second signal transmission coil can transmit a signal in a non-contact manner with each other. As a result, in the vehicle information display system, the meter instrument and the master-side instrument can be connected to each other to be able to easily transmit electric power and a signal by fitting the second case of the meter instrument to the fitting recessed part of the first case of the master-side instrument. As a result, the vehicle information display system exhibits an effect of easily replacing a portion for displaying vehicle information.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle information display system comprising:
   a master-side instrument serving as a power supply source and including a first power transmission coil capable of transmitting electric power in a non-contact manner, a first signal transmission coil capable of transmitting a signal in a non-contact manner, and a first case in which the first power transmission coil and the first signal transmission coil are disposed and a fitting recessed part is formed; and
   a meter instrument serving as a supply destination of electric power from the master-side instrument and including a display unit capable of displaying vehicle information, a second power transmission coil capable of transmitting electric power in a non-contact manner with the first power transmission coil, a second signal transmission coil capable of transmitting a signal in a non-contact manner with the first signal transmission coil, and a second case in which the display unit, the second power transmission coil, and the second signal transmission coil are disposed, the second case being capable of fitting into the fitting recessed part, wherein
   the master-side instrument and the meter instrument have a positional relation such that in a state in which the fitting recessed part of the first case and the second case are fitted to each other, the first power transmission coil is opposed to the second power transmission coil, and the first signal transmission coil is opposed to the second signal transmission coil.

2. The vehicle information display system according to claim 1, wherein
   the master-side instrument includes a master-side controller that periodically transmits electric power to the meter instrument side via the first power transmission coil, and transmits a connection request to the meter instrument side via the first signal transmission coil,
   the meter instrument includes a meter-side controller that is operated in response to electric power received from the master-side instrument via the second power transmission coil, and responds to the connection request received from the master-side instrument via the second signal transmission coil, and
   the master-side controller and the meter-side controller transmit and receive data required for display on the display unit after a response of the meter-side controller.

* * * * *